April 22, 1941.  A. MONCHAMPS  2,239,243
OIL CIRCUIT BREAKER FOR ULTRA HIGH SPEED RECLOSURE
Filed May 24, 1938
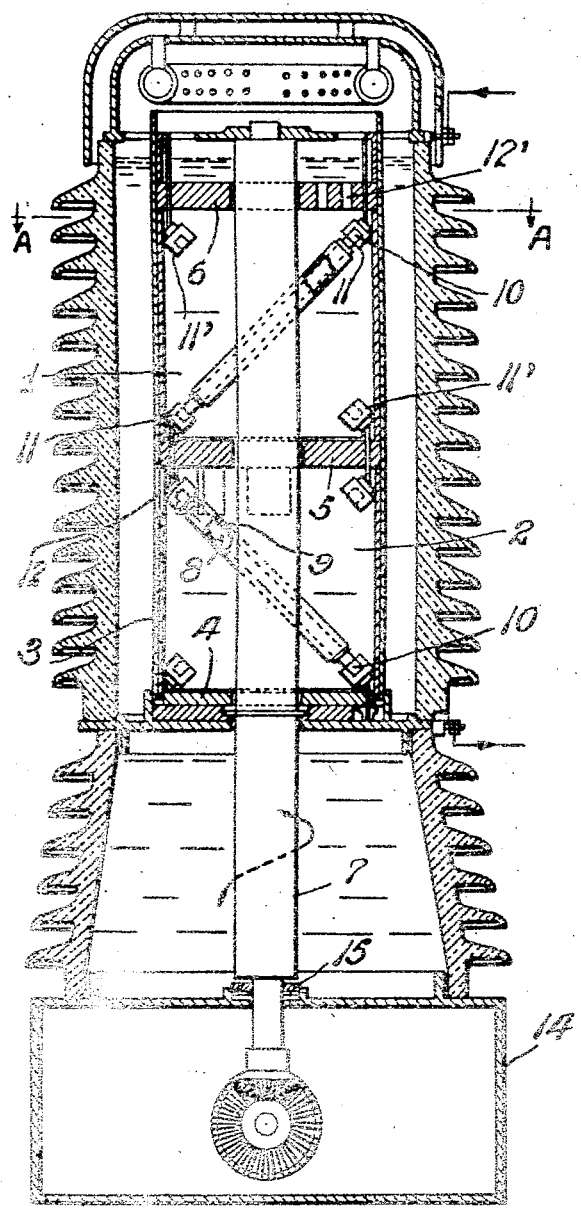
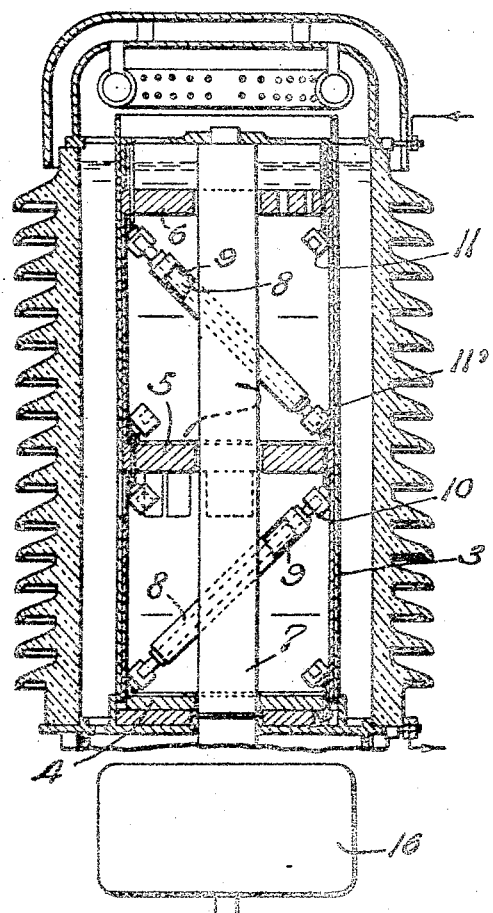
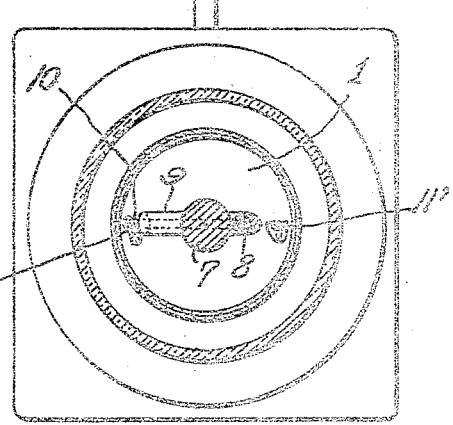

Patented Apr. 22, 1941

2,239,243

UNITED STATES PATENT OFFICE 2,239,243

OIL CIRCUIT BREAKER FOR ULTRA HIGH SPEED RECLOSURE

Albert Monchamps, La Plaine Saint - Denis, France, assignor to Societe Anonyme dite: Forges et Atelieres de Constructions Electriques de Jeumont, Paris, France Application May 24, 1938, Serial No. 209,820
In France June 4, 1937

4 Claims. (Cl. 200—150)

This invention relates to an oil circuit breaker wherein the circuit is broken and immediately reestablished.

In present A.-C. transmission and distribution systems, the extent of which may be considerable, there are numerous possible reasons for the interruption of the circuit.

The serious damages which are accidentally incurred by the lines, cables, apparatus, transformers, etc., necessarily cause entire sections of the system an outage which will only cease upon the completion of the indispensable repairs.

However there are causes of interruption in the delivery of electric power that might be eliminated without delay, should the necessary breaking of the circuit be of only such duration that the connected synchronous load cannot get out of step. It is the individual synchronization of the synchronous machines which is mostly responsible for long and costly shutdowns. Among such causes of interruption, there may be mentioned the short circuits or the inceptions of ground arcs produced in high tension lines or bus bars by lightning strokes, birds, rodents, the fall of branches or conductors of moderate cross-section, etc. Accidentally drawn by foreign bodies, the arc will cease upon the opening of the circuit breaker through which it was fed, and will not restrike when the circuit breaker is closed again.

The object of the present invention is an oil circuit breaker of the rotating type which will interrupt any current within its rupturing ability on the circuit it protects, and then, after an interval of time that is sufficient for the arc path at the fault location to recover its dielectric strength, reclose the circuit soon enough to prevent the synchronous load connected in such a circuit from getting out of step.

So-called ultra high speed reclosing oil circuit breakers are known, in which the interval of time counted from the time the trip coil is energized to the time the circuit is reclosed amounts to from 30 to 80 cycles, depending on the system voltage. These are only conventional breakers to which have been added control mechanisms of a special design, aimed to produce the greatest possible reclosing speed and shortest overall operating time. In such breakers the moving contacts being in the closed position must first be accelerated, then decelerated, and stopped before they start closing in the opposite direction. Due to the inertia of the moving contacts and mechanism, such a stop necessarily involves a great loss of time, and submits most parts to comparatively high stresses.

The object of the invention is a circuit breaker of the rotating type which will in particular accomplish a full operating cycle made up of an opening and an immediate reclosure without a stop of the moving contacts.

With this and other objects of the invention which will become apparent from the description detailed below, the invention is shown schematically in the drawing in which:

Figure 1 is a vertical cross-sectional view through the circuit breaker which is, for example, of the vertical shaft type. The contacts are represented in a first closure position.

Figure 2 illustrates a view similar to Figure 1, in which the movable contacts occupy a second closure position after having performed a rotation around the vertical axis.

Figure 3 is a sectional view taken on the section line A—A of Figure 1.

Throughout the various figures, the same reference numbers designate the same elements or parts respectively.

The circuit breaker comprises a number of superposed chambers which are normally filled with oil. Figs. 1 and 2 represent for example two such chambers which are defined by a cylinder 3 made of insulating material and divided into two parts by three separating paritions 4, 5, and 6 also made of insulating material. A vertical shaft 7, of circular cross-section, made of insulating material, passes without appreciable play through circular openings provided at the center of the insulating partitions. This shaft is traversed obliquely by two arms or cross bars located respectively inside chambers 1 and 2. Each rotating arm comprises a central rod 8 made of any desired conducting material which is inclosed in a sheath or sleeve 9 made of insulating material. The ends 10 of the rod 8 act, in the chambers 1 and 2, as movable contacts of the circuit breaker.

In accordance with the invention, there is provided, for each moving contact 10, two electrically connected stationary contacts 11 and 11' located on the circle described by the moving contact. In the case of the breaker represented on Figs. 1 to 3, wherein the vertical shaft can revolve about 180°, contacts 11 and 11' are diametrically opposed, and the four stationary contacts inside one chamber are located in one vertical plane including the axis of the shaft, at the four corners of a rectangle whose sides are respectively parallel and perpendicular to the axis of the shaft. In an actual breaker, the shaft may revolve an angle subtantially smaller or larger than 180° without the limits of the invention being exceeded.

The lower stationary contacts of the upper chamber and the upper stationary contacts of the lower chamber are electrically connected. The extreme pairs of contacts of the entire assembly constitute the terminals of the pole unit.

The above described assembly is conveniently mounted upon the framework 14 which incloses the control mechanism from which the vertical shaft 7 extending down through the stuffing box 15 receives its power through a set of bevel gears.

Chambers 1 and 2 are respectively provided in their upper portions with horizontal openings 12' and radial openings 12. In Figs. 1 and 2, the moving contacts are shown in either closing position of the rotating unit, the entire travel amounting to 180°.

The operation of the circuit-breaker is as follows. In case of a fault arising somewhere on the circuit which the breaker controls, the moving contacts will start their opening travel at once, each of them drawing an arc between itself and the stationary contact it has just left. In each chamber the path of the upper arc will be both cooled and deionized by a stream of unsoiled oil leaving that chamber under pressure, thus preventing the arc from restriking upon one of the next current zeros, and accomplishing the breaking of the circuit. Without having to decelerate and stop, the entire rotating unit will then pursue its travel in the same direction until the second closing position of the moving contact is reached and the circuit is fed anew through the other pairs of stationary contacts.

If, in the meantime, the cause of the fault has disappeared, the power will flow on. If it has not disappeared, the reclosing operation will only reestablish a short circuit which may be cleared by the same breaker after such interval of time as it may require for the accomplishment of the full open-close-open cycle, or by some other breaker mounted in series. The travel during the second opening may proceed in the same direction, or in the opposite direction. Provision is made, in the design of the driving mechanism, for stopping the rotating unit in its opening position at the end of its second consecutive opening.

Obviously the provision of additional contacts in each chamber is independent of the position of the rotating unit, the shaft of which may be vertical, as in Figs. 1 and 2, or horizontal, or may occupy any intermediate position.

I claim:

1. An oil circuit breaker for high tension circuits comprising a rotatry shaft, a contact member carried by said shaft, a pair of stationary contacts adapted to be bridged by said contact member in one position of said shaft, and another pair of oppositely disposed stationary contacts connected in parallel with said first pair of stationary contacts adapted to be bridged by said contact member in another position of said shaft, the partial rotation of said shaft opening the circuit at the first mentioned pair of stationary contacts and then promptly reclosing the circuit at the other pair of stationary contacts.

2. An oil circuit breaker for high tension circuits comprising a rotary shaft, a pair of superposed oil chambers, said shaft extending vertically through said chambers, external means for turning said shaft, an insulated contact member carried by said shaft in each of said chambers, a pair of oppositely disposed stationary contacts in each of said chambers, said stationary contacts adapted to be bridged by the respective contact member in one position of said shaft, and another pair of oppositely disposed stationary contacts in each of said chambers connected in parallel with said first mentioned contacts, said other pair of stationary contacts adapted to be bridged by said contact member in another position of said shaft, the partial rotation of said shaft opening the circuit at the first mentioned pair of stationary contacts and then promptly reclosing the circuit in the same direction at the other pair of stationary contacts in each of said chambers simultaneously.

3. An oil circuit breaker for high tension circuits comprising a shaft rotatable in steps in opposite directions, a contact member carried by said shaft, a pair of oppositely disposed stationary contacts adapted to be bridged by said contact member in one position of said shaft, and another pair of oppositely disposed stationary contacts connected in parallel with said first mentioned contacts adapted to be bridged by said contact member in another position of said shaft, stepwise rotation of said shaft in one direction opening the circuit at first mentioned pair of stationary contacts and then promptly reclosing the circuit in the same direction at the other pair of stationary contacts.

4. An oil circuit breaker for high tension circuits comprising a shaft rotatable in steps in opposite directions, a contact member carried by said shaft, a pair of oppositely disposed stationary contacts adapted to be bridged by said contact member in one position of said shaft, and another pair of oppositely disposed stationary contacts connected in parallel with said first mentioned contacts adapted to be bridged by said contact member in another position of said shaft, stepwise rotation of said shaft in one direction opening the circuit at the first mentioned pair of stationary contacts and then promptly reclosing the circuit in the same direction at the other pair of stationary contacts, and subsequent stepwise rotation of said shaft in the other direction opening the circuit again at said other pair of stationary contacts.

ALBERT MONCHAMPS.